United States Patent
Cho et al.

(10) Patent No.: US 6,584,533 B1
(45) Date of Patent: Jun. 24, 2003

(54) DOCKING SYSTEM FOR A COMPUTER

(75) Inventors: Woo-Jong Cho, Suwon (KR); Hyun-Kuk Shin, Suwon (KR)

(73) Assignee: Samsung Electronics Co., Ltd., Suwon (KR)

(*) Notice: Subject to any disclaimer, the term of this patent is extended or adjusted under 35 U.S.C. 154(b) by 344 days.

(21) Appl. No.: 09/653,350

(22) Filed: Aug. 31, 2000

(30) Foreign Application Priority Data

Nov. 10, 1999 (KR) ............................................. 99-49715

(51) Int. Cl.⁷ ........................ G06F 13/00; G06F 13/12
(52) U.S. Cl. ........................ 710/303; 710/72; 361/686
(58) Field of Search ............................ 710/72, 303, 8, 710/300, 306; 714/23; 713/100; 361/683, 686; 385/100; 359/152, 159, 163; 439/374; 711/102; 341/100, 101; 455/3.01

(56) References Cited

U.S. PATENT DOCUMENTS 5,877,882 A * 3/1999 Green et al.
6,029,215 A * 2/2000 Watts, Jr. et al.
6,285,911 B1 * 9/2001 Watts, Jr. et al.

* cited by examiner

Primary Examiner—Gopal C. Ray
(74) Attorney, Agent, or Firm—Robert E. Bushnell, Esq.

(57) ABSTRACT

A docking system for a computer includes a portable computer having a first signal transmitting unit and a main computer having a second signal transmitting unit. The portable computer includes a read-only memory (ROM) wherein a first operating system is stored, a microprocessor, a memory wherein commands and data are stored, and a first docking controller for selecting an operating system according to the existence or non-existence of docking of the portable computer at the main computer. The main computer includes an auxiliary storage device wherein a second operating system is stored, a second microprocessor, a second memory wherein commands and data are stored, and a second docking controller for controlling the first and second microprocessors so that they are used simultaneously when the portable computer is docked at the main computer. The signal transmitting units control transmission and reception of data between the portable computer and the main computer.

20 Claims, 4 Drawing Sheets

DOCKING SYSTEM FOR A COMPUTER

CLAIM OF PRIORITY

This application makes reference to, incorporates the same herein, and claims all benefits accruing under 35 U.S.C. §119 from my application DOCKING SYSTEM OF COMPUTER filed with the Korean Industrial Property Office on Nov. 11, 1999 and there duly assigned Ser. No. 49715/1999.

BACKGROUND OF THE INVENTION

1. Field of the Invention

The present invention relates to a docking system for a computer and, more particularly, to a docking system for a computer having an improved structure for sharing a bus between a portable computer and a main computer.

2. Description of the Related Art

In general, a portable computer has a reduced number of functions and is made to be easy to carry compared to a desk top computer. Within the class of portable computers, there are notebook computers, personal digital assistants (PDAs), and handheld personal computers (HPCs).

A typical PDA includes a microprocessor and a memory, such as a random access memory (RAM) and a read-only memory (ROM), for storing and processing information, and the information is provided as an input through a touch screen. The PDA uses an information storage device, such as a flash memory, instead of auxiliary storage, such as a hard disk drive (HDD). The information storage device is small and does not require an additional driving apparatus. A typical HPC is provided with a personal information management system (PIMS), as well as a word processor or a communications program. The HPC is usually used to assist a desktop PC or a notebook computer. The PDA and HPC having the above structures are used by being connected to a desktop PC or a notebook computer via a serial port or an infrared ray port.

Typically, a portable computer is docked to a desktop computer via respective ports connected in series, and the portable computer and the desktop computer each have a microprocessor which operates separately and independently. As a result, data transmission between the portable computer and the desktop computer is the only possibility; data cannot be transmitted in real time between the two computers, and thus a program cannot be executed in real time; communication between the two computers can only be accomplished by downloading; the portable computer can only accomplish a limited amount of work, even when docked to the desktop computer, since resources of the latter cannot be used by the former; applications performed on the desktop computer cannot be performed on the portable computer; compatibility between the two computers is minimal and limited; and there are limits to the functions performed by the portable computer, even when upgrading.

SUMMARY OF THE INVENTION

To solve the above problems, it is an objective of the present invention to provide a docking system for a computer in which the bus sharing structure between a portable computer and a main computer and the structure of a main computer are improved so that real time execution of a program, realization of a dual microprocessor capability, and sharing of data and peripheral devices are possible.

Accordingly, to achieve the above objective, there is provided a docking system for a computer comprising: a portable computer, including a read-only memory (ROM) wherein a first operating system is stored, a microprocessor, a memory wherein commands and data are stored, and a first docking controller for selecting an operating system according to the existence of docking; a main computer or docking station, including an auxiliary storage device wherein a second operating system is stored, a second microprocessor, a second memory wherein commands and data are stored, and a second docking controller for controlling the first and second microprocessors so that they are used simultaneously when the portable computer is docked at the main computer; and first and second signal transmitting units provided at the portable computer and the main computer, respectively, for performing the transmission and reception of data between the portable computer and the main computer.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
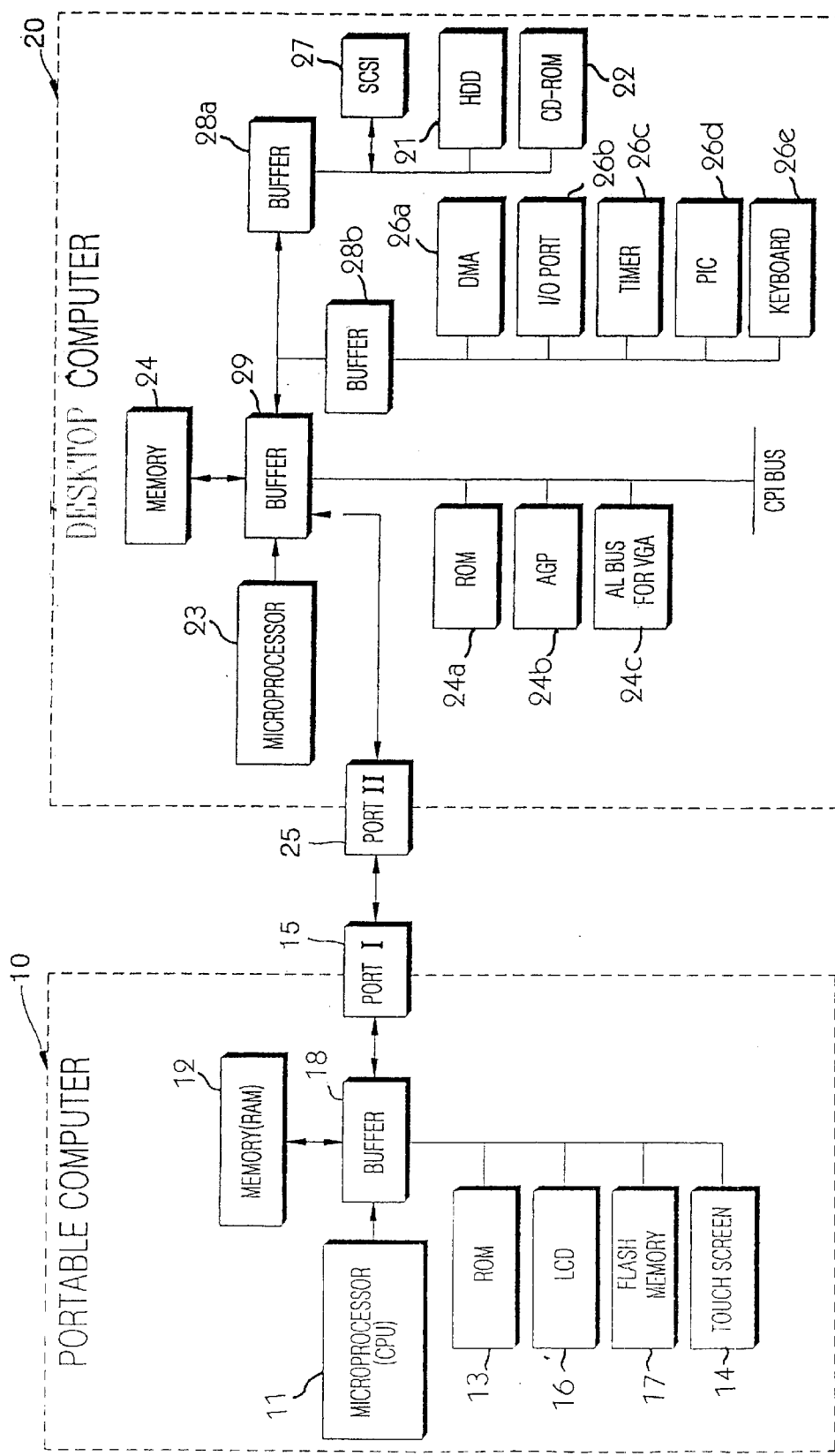
FIG. 1 is a block diagram showing a conventional docking system for a portable computer.

As shown in FIG. 1, a conventional docking system for a portable computer includes a portable computer 10, such as a typical PDA or HPC, and a desktop computer 20 at which the portable computer 10 is docked. Referring to the drawing, the portable computer 10 is small and includes a microprocessor 11, such as a central processing unit (CPU), and a memory, such as RAM 12 and ROM 13, for processing and storing information, a touch screen 14 for inputting information, and an liquid crystal display (LCD) device 16 for displaying information. The portable computer 10 also includes a port I 15 for the connection to a desktop computer 20, which will be described later, and which may be either a serial port or an infrared ray port. A flash memory 17 and buffer 18 are also provided.

The desktop computer 20, which has high performance and multiple functions, includes auxiliary storage devices such as a hard disk drive (HDD) 21 or a CD-ROM 22, various extension slots, and ports, in addition to a microprocessor 23 and a memory 24. The desktop computer 20 also includes a port II 25 connected to port I 15. Other components are ROM 24a, AGP 24b, AL BUS FOR VGA 24c, DMA 26a, I/O port 26b, timer 26c, PIC 26d, keyboard 26e, SCSI 27, and buffers 28a, 28b and 29.

In this docking system, each of the portable computer 10 and the desktop computer 20 has a separate microprocessor, thus forming independent systems. By electrically connecting the port I 15 and the port II 25 in series, data is not transmitted therebetween in a real time manner.

In the docking system for the portable computer having the above structure, because the portable computer 10 and the desktop computer 20 are operated separately, it is a drawback that only data transmission is possible between the computers 10 and 20. Also, since data cannot be transmitted in real time, a program cannot be executed in real time. Thus, it is inconvenient that communication between the computers 10 and 20 is only accomplished by means of downloading.

Also, only a limited amount of work is possible when a program of the portable computer 10 is executed since such resources as the HDD 21 and I/O (input/output) devices, memory or ports of the desktop computer 20 cannot be used. The portable computer 10 uses software stored in the ROM 24a, and the number of software programs available is limited when the portable computer 10 is purchased. Thus, a particular application performed on the desktop computer 20 which has improved performance may not be executed on the portable computer 10. Also, as the microprocessors 11 and 23 of the portable computer 10 and the desktop computer 20, respectively, are different from each other, compatibility is lowered. Furthermore, the function of the portable computer 10 is limited as to upgrading, and even when the performance of extension units, such as a video card, a sound card, a LAN card or an I/O device of the desktop computer 20, is improved, the improved extension units cannot be used.

Figure 2:
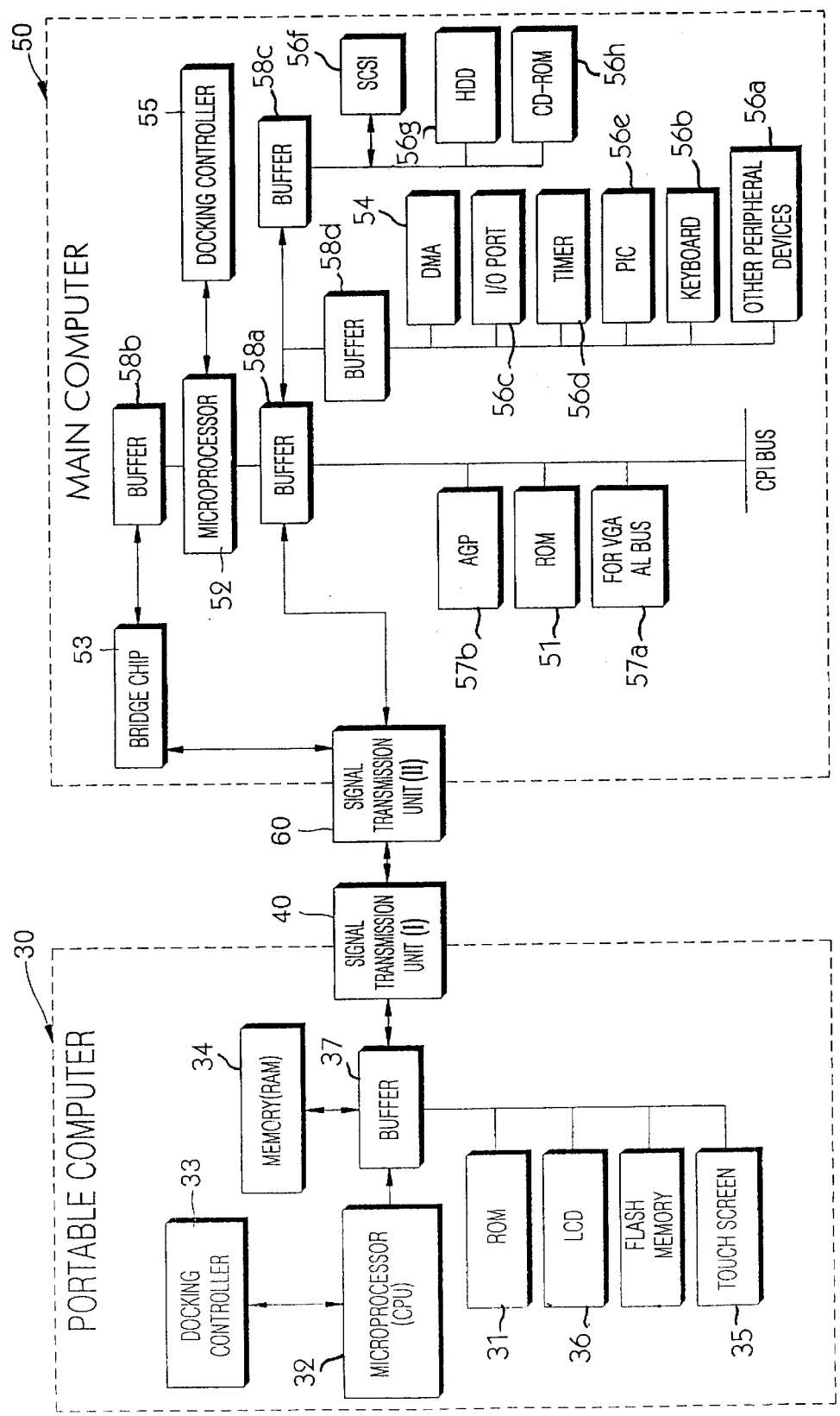
FIG. 2 is a block diagram showing the docking system for a computer according to a preferred embodiment of the present invention.

Referring to FIG. 2, a docking system for a computer according to the present invention includes: a portable computer 30 operated according to a first operating system; a main computer 50 independently operated according to a second operating system, while dual microprocessing is possible when the portable computer 30 is docked at the main computer 50; and first and second signal transmitting units 40 and 60, respectively, provided at the portable computer 30 and the main computer 50, respectively.

The portable computer 30 is small and is made to be easy to carry, and includes a ROM 31 wherein the first operating system is stored, a first microprocessor 32, a first memory 34 wherein commands and data are stored, and a first docking controller 33 for controlling the selection of an operating system according to whether the portable computer 30 is docked at main computer 50. Also, the portable computer 30 includes a touch screen 35 for inputting information, an LCD device 36 for displaying information and a buffer 37. The first microprocessor 32 and the first memory 34 of the portable computer 30 are continuously used after the portable computer 30 is docked at main computer 50, so that real time data processing is performed between the portable computer 30 and main computer 50. In particular, the first microprocessor 32 is dually used with a second microprocessor 52 of main computer 50 when the portable computer 30 is docked at main computer 50. When the portable computer 30 is independently used, a program is executed by using the first operating system stored in the ROM 31, the first microprocessor 32 and the first memory 34.

The first docking controller 33 detects a docking state between the first signal transmitting unit 40 and the second signal transmitting unit 60, stores the detected state in the first memory 34, and resets the first microprocessor 32 to use the second operating system when the first and second signal transmitting units 40 and 60 are connected.

The main computer 50 includes an auxiliary storage device or ROM 51 wherein a second operating system is stored, a second microprocessor 52, a second memory or direct memory access (DMA) 54 wherein commands and data are stored, and a second docking controller 55 for controlling simultaneous use of the first and second microprocessors 32 and 52 when the portable computer 30 is docked at the main computer 50. Also, the main computer 50 includes other peripheral or I/O devices 56a (such as a mouse), a keyboard 56b, a monitor (not shown), a plurality of extension slots where a graphic card 57a, a sound card 57b, a modem (not shown) and a LAN card (also not shown) are installed, and serial and parallel I/O ports 56c. The main computer 50 also includes timer 56d, PIC 56e, SCSI 56f, hard disk drive (HDD) 56g, CD-ROM 56h, and buffers 58a, 58b and 58c and 58d, and is operated like a general desktop computer when the portable computer 30 is not docked therewith.

Main computer 50 also includes a bridge chip 53 which causes the first and second microprocessors 32 and 52, respectively, to be shared when the portable computer 30 is docked at the main computer 50. The second docking controller 55 detects a docking state between the portable computer 30 and the main computer 50 and reboots the system. The first microprocessor 32 is connected to the bridge chip 53 via buffer 37, and first and second signal transmitting units 40 and 60, respectively, while the second microprocessor 52 is connected to the bridge chip 53 via buffer 58b. For example, an 82443BX chipset of Intel Corporation may be used as the bridge chip 53. Accordingly, when sharing of the first and second microprocessors 32 and 52, respectively, is caused by bridge chip 53 at the time that the portable computer 30 is docked at the main computer 50, data processing speed is improved relative to the case in which there is no docking and the microprocessors 32 and 52 are independently used.

The first and second signal transmitting units 40 and 60, respectively, are provided at the portable computer 30 and the main computer 50, respectively, so as to perform transmission and reception of data between the portable computer 30 and the main computer 50.

Figure 3:
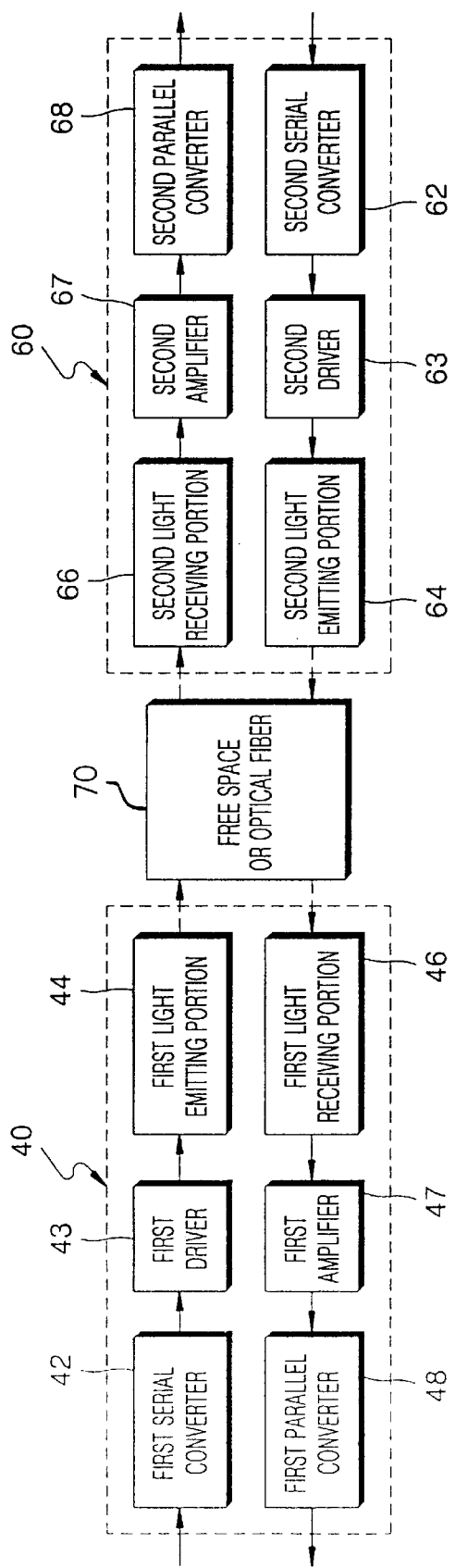
FIG. 3 is a block diagram showing first and second signal transmitting units of FIG. 2 according to a preferred embodiment of the present invention.

Referring to FIG. 3, according to a preferred embodiment of the present invention, the first and second signal transmitting units 40 and 60, respectively, are configured so as to be able to convert an input electric signal to an optical signal, and to transmit the converted signal to each other.

The first signal transmitting unit 40 includes a first serial converter 42 which receives a transmission signal output from the portable computer 30, a first driver 43, a first light emitting portion 44 for converting an input electric information signal to an optical information signal, a first light receiving portion 46, a first amplifier 47 and a first parallel converter 48.

The first serial converter 42 receives a parallel transmission signal output from the portable computer 30 and converts the parallel signal to a serial signal. The first driver 43 drives the first light emitting portion 44 according to the signal output from the first serial converter 43. The first light emitting portion 44, which is driven by the first driver 43 to emit light, converts an input electric information signal to an optical information signal and transmits the converted signal to the second signal transmitting unit 60 via free space or optical fiber 70. The first light emitting portion 44 is, preferably, a semiconductor laser array and, in particular, a vertical cavity surface emitting laser array. The first light receiving portion 46 receives an optical information signal output from a the second signal transmitting unit 60 via free space or optical fiber 70, and converts the received signal to an electric information signal. The first amplifier 47 amplifies the converted electric signal. The first parallel converter 48 converts the serial signal amplified by the first amplifier 47 to a parallel signal.

The second signal transmitting unit 60 includes a second serial converter 62, a second driver 63, a second light emitting portion 64 for converting an input electric information signal to an optical information signal, a second light receiving portion 66, a second amplifier 67 and a second parallel converter 68. The second serial converter 62 converts a parallel transmission signal output from the main computer 50 to a serial signal, and transmits the converted signal to the second driver 63. The second light emitting portion 64, which is driven by the second driver 63 to emit light, converts an input electric information signal to an optical information signal, and transmits the converted signal to the first light receiving portion 46 of the first signal transmitting unit 40 via free space or optical fiber 70. The second light receiving portion 66 receives an optical information signal input from the first light emitting portion 44 via free space or optical fiber 70, and converts it to an electric information signal. The second amplifier 67 amplifies the converted electric signal received by the second light receiving portion 66. The amplified serial signal is converted to a parallel signal by the second parallel converter 68.

In this case, the optical signal is transmitted via free space or optical fiber 70 between the first and second signal transmitting units 40 and 60, respectively, that is, between the first light emitting portion 44 and the second light receiving portion 66, and between the second light emitting portion 64 and the first light receiving portion 46.

Furthermore, each of the transmission signals inputted to the first and second serial converters 42 and 62, respectively, is analyzed, classified, error-corrected, encoded and signal-synchronized by a pre-processor (not shown) so that the transmission signal is modified so as to be suitable for a desired protocol. Also, each of the received signals outputted from the first and second parallel converters 48 and 68, respectively, is error-corrected and signal-synchronized by a post-processor (not shown) so that the received signals are classified into a control signal and a data signal, and are converted so as to be the same as the original transmission signal.

Figure 4:
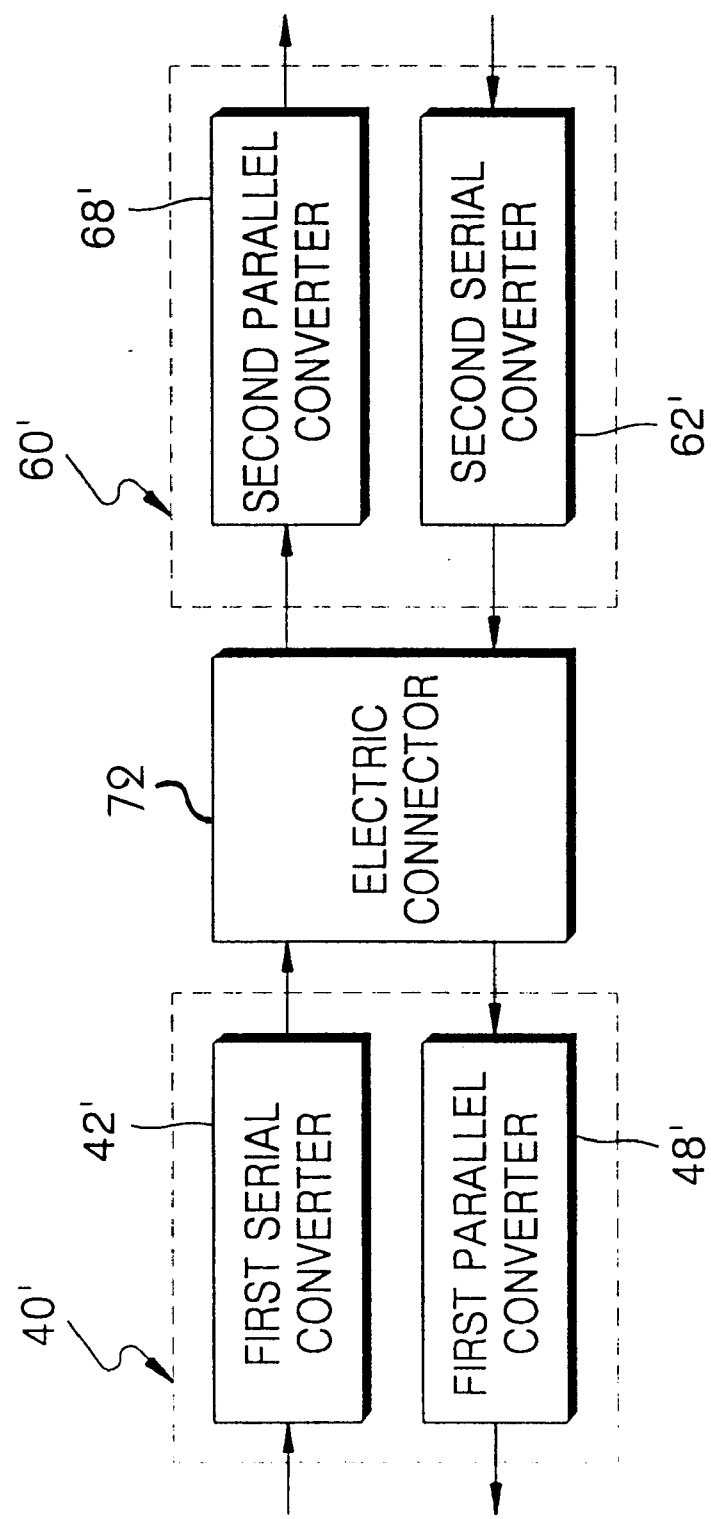
FIG. 4 is a block diagram showing first and second signal transmitting units of FIG. 2 according to another preferred embodiment of the present invention.

Referring to FIG. 4, first and second signal transmitting units 40' and 60', respectively, have electric connection structures. That is, the first signal transmitting unit 40' includes: a first serial converter 42' for receiving a parallel transmission signal output from the portable computer 30, and for converting the parallel signal to a serial signal for transmission to second signal transmitting unit 60' via electric connector 72; and a first parallel converter 48' for converting the serial signal output received from the second signal transmitting unit 60' via electric connector 72 to a parallel signal.

The second signal transmitting unit 60' includes: a second serial converter 62' for receiving a parallel transmission signal output from the main computer 50 and converting the parallel signal to a serial signal for transmission to first signal transmission unit 40' via electric connector 72; and a second parallel converter 68' for converting the serial signal output from the first signal transmitting unit 42' to a parallel signal.

Preferably, each of the first and second signal transmitting units 40' and 60', respectively, further includes a pre-processor and a post-processor (not shown) for performing error-correction and signal-synchronization.

In the docking system of a computer having the above structure, when the portable computer 30 is docked at the main computer 50 via the first and second signal transmitting units 40 and 60, the docking controllers 33 and 55 reset the portable computer 30 and the main computer 50, respectively. Next, when the portable computer 30 and the main computer 50 are rebooted, the ROM BIOS stored in the ROM 51 of the main computer 50 is executed. Moreover, a bus sharing system is set between the first and second microprocessors 31 and 51, respectively, by the bridge chip 53 so that an operating system for the dual microprocessing environment is operated. Preferably, both computers 30 and 50 are operated by the second operating system.

It should be noted that the docking system for a computer according to the present invention may be used to connect a plurality of portable computers to one main computer for sharing purposes. In this case, when the portable computers are docked to the main computer via first and second signal transmitting units, the portable computers and the main computer can exchange passwords for identification.

As described above, in the docking system for a computer according to the present invention, when the portable computer 30 and the main computer 50 are independently used, the portable computer 30 provides its advantage of being easy to carry and small, while the main computer 50 provides its advantage of high performance and multiple functions. When docking takes place, dual microprocessing is possible so that not only is a high performance computer system obtained, but also real time data transmission between the computers 30 and 50 and real time program execution are possible. Thus, through the docking of the computers 30 and 50, resources such as the HDD 56g, the I/O or peripheral devices 56a, the memory (DMA) 54, and the ports of the high performance main computer 50 can be utilized by the portable computer 30 when executing its own program(s). Moreover, when the performance of the main computer 50 is improved, the performance of the portable computer 30 can also be improved whenever it is docked at the main computer 50.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A docking system for a computer, comprising:
  a portable computer including a read-only memory (ROM) wherein a first operating system is stored, a first microprocessor, a first memory wherein commands and data are stored, and first docking controlling means for selecting an operating system according to an existence of docking;
  a main computer including an auxiliary storage device wherein a second operating system is stored, a second microprocessor, a second memory wherein commands and data are stored, and a second docking controlling means for controlling the first and second microprocessors so that they are used simultaneously when the portable computer is docked at the main computer; and
  first and second signal transmitting units provided at the portable computer and the main computer, respectively, for performing transmission and reception of data between the portable computer and the main computer.

2. The docking system as claimed in claim 1, wherein the first docking controlling means comprises a first docking controller which detects a docking state between the first signal transmitting unit and the second signal transmitting unit, stores the detected state in the first memory, and resets the first microprocessor to make the portable computer use the second operating system when the portable computer is docked at the main computer.

3. The docking system as claimed in claim 2, wherein said second docking controlling means comprises:

a bridge chip connected to said second microprocessor, and connected via said first and second signal transmitting units to said first microprocessor, for causing said first and second microprocessors to operate in a sharing mode when the portable computer is docked to the main computer; and a second docking controller connected to said second microprocessor for detecting a docking state between the portable computer and the main computer.

4. The docking system as claimed in claim 3, wherein optical signals are transmitted between the first and second signal transmitting units via one of a free space, an optical fiber, and an electric connector.

5. The docking system as claimed in claim 1, wherein the second docking controlling means comprises:

a bridge chip for causing the first and second microprocessors to be shared when the portable computer is docked at the main computer; and a second docking controller which detects a docking state between the portable computer and the main computer and reboots the second operating system.

6. The docking system as claimed in claim 1, wherein the first signal transmitting unit comprises:

a first light emitting portion for converting a first input electric information signal to a first optical information signal, and for transmitting the first optical information signal to the second signal transmitting unit as emitted light;

a first driver for driving the first light emitting portion by receiving a transmission signal output from the portable computer and producing the first input electric information signal;

a first light receiving portion for receiving a second optical information signal input from the second signal transmitting unit, and for converting the received signal to a first electric information signal; and a first amplifier for amplifying the first electric information signal from the first light receiving portion to produce a first signal output; and wherein the second signal transmitting unit comprises:

a second light emitting portion for converting a second input electric information signal to the second optical information signal, and for transmitting the second optical information signal to the first signal transmitting unit as emitted light;

a second driver for driving the second light emitting portion by receiving a transmission signal output from the main computer and producing the second input electric information signal;

a second light receiving portion for receiving the first optical information signal input from the first signal transmitting unit, and for converting the received signal to a second electric information signal; and a second amplifier for amplifying the second electric information signal from the second light receiving portion to produce a second signal output.

7. The docking system as claimed in claim 6, wherein optical signals are transmitted between the first and second signal transmitting units via one of a free space and an optical fiber.

8. The docking system as claimed in claim 6, wherein the first signal transmitting unit further comprises:

a first serial converter connected to an input of the first driver for receiving a parallel transmission signal output from the portable computer, and for converting the received parallel transmission signal output to a first serial signal; and a first parallel converter for converting the first signal output of the first amplifier from a serial signal to a parallel signal; and wherein the second signal transmitting unit further comprises:

a second serial converter connected to an input of the second driver for receiving a parallel transmission signal output from the main computer, and for converting the received parallel transmission signal output to a second serial signal; and a second parallel converter for converting the second signal output of the second amplifier from a serial signal to a parallel signal.

9. The docking system as claimed in claim 8, wherein optical signals are transmitted between the first and second signal transmitting units via one of a free space and an optical fiber.

10. The docking system as claimed in claim 1, wherein the first signal transmitting unit comprises:

a first serial converter for receiving a parallel transmission signal output from the portable computer, and for converting the received parallel transmission signal output to a first serial signal; and a first parallel converter for converting a second serial signal input received from the second signal transmitting unit to a first parallel signal; and wherein the second signal transmitting unit comprises:

a second serial converter for receiving a parallel transmission signal output from the main computer, and for converting the received parallel transmission signal output to the second serial signal; and a second parallel converter connected to the main computer for converting the first serial signal input received from the main computer to a second parallel signal.

11. A docking system for a computer, comprising:

a portable computer including first means for storing a first operating system, a first microprocessor, and first docking controlling means for selecting an operating system according to an existence of docking;

a main computer including second storage means for storing a second operating system, a second microprocessor, and second docking controlling means for controlling the first and second at microprocessors so that they are used simultaneously when the portable computer is docked at the main computer; and signal transmitting means connecting the portable computer to the main computer for performing transmission and reception of data by the portable computer and the main computer.

12. The docking system as claimed in claim 11, wherein said signal transmitting means comprises a first signal transmitting unit connected to said portable computer and a second signal transmitting unit connected to said main computer, and wherein said first docking controlling means detects a docking state between the first signal transmitting unit and the second signal transmitting unit, stores the detected state in the first storage means, and resets the first microprocessor to make the portable computer use the second operating system when the portable computer is docked at the main computer.

13. The docking system as claimed in claim 11, wherein said second docking controlling means comprises:
   a bridge chip for causing the first and second microprocessors to be shared when the portable computer is docked at the main computer; and
   a second docking controller which detects the docking state between the portable computer and the main computer and reboots the second operating system.

14. The docking system as claimed in claim 11, wherein said signal transmitting means comprises a first signal transmitting unit mounted on said portable computer and a second signal transmitting unit mounted on said main computer.

15. The docking system as claimed in claim 14, wherein the first signal transmitting unit comprises:
   a first light emitting portion for converting a first input electric information signal to a first optical information signal, and for transmitting the converted signal to the second signal transmitting unit as emitted light;
   a first driver for driving the first light emitting portion by receiving a transmission signal output from the portable computer and producing the first input electric information signal;
   a first light receiving portion for receiving an optical information signal input from the second signal transmitting unit, and for converting the received signal to a first electric information signal; and
   a first amplifier for amplifying the first electric information signal from the first light receiving portion to produce a first signal output; and
wherein the second signal transmitting unit comprises:
   a second light emitting portion for converting a second input electric information signal to a second optical information signal, and for transmitting the converted signal to the first signal transmitting unit as emitted light;
   a second driver for driving the second light emitting portion by receiving a transmission signal output from the main computer and producing the second input electric information signal;
   a second light receiving portion for receiving an optical information signal input from the first signal transmitting unit, and for converting the received signal to a second electric information signal; and
   a second amplifier for amplifying the second electric information signal from the second light receiving portion to produce a second signal output.

16. The docking system as claimed in claim 15, wherein optical signals are transmitted between the first and second signal transmitting units via one of a free space and an optical fiber.

17. The docking system as claimed in claim 15, wherein the first signal transmitting unit further comprises:
   a first serial converter connected to an input of the first driver for receiving a parallel transmission signal output from the portable computer, and for converting the received parallel transmission signal output to a first serial signal; and
   a first parallel converter for converting the first signal output of the first amplifier from a serial signal to a parallel signal; and
wherein the second signal transmitting unit further comprises:
   a second serial converter connected to an input of the second driver for receiving a parallel transmission signal output from the main computer, and for converting the received parallel transmission signal output to a second serial signal; and
   a second parallel converter for converting the second signal output of the second amplifier from a serial signal to a parallel signal.

18. The docking system as claimed in claim 17, wherein optical signals are transmitted between the first and second signal transmitting units via one of a free space and an optical fiber.

19. The docking system as claimed in claim 14, wherein the first signal transmitting unit comprises:
   a first serial converter for receiving a parallel transmission signal output from the portable computer, and for converting the received parallel transmission signal output to a first serial signal; and
   a first parallel converter for converting a serial signal input received from the second signal transmitting unit to a first parallel signal, and
wherein the second signal transmitting unit comprises:
   a second serial converter for receiving a parallel transmission signal output from the main computer, and for converting the received parallel transmission signal output to a second serial signal; and
   a second parallel converter connected to the main computer for converting a serial signal input received from the main computer to a second parallel signal.

20. The docking system as claimed in claim 14, wherein said second docking controlling means comprises:
   a bridge chip connected to said second microprocessor, and connected via said first and second signal transmitting units to said first microprocessor, for causing said first and second microprocessors to operate in a sharing mode when the portable computer is docked to the main computer; and
   a second docking controller connected to said second microprocessor for detecting a docking state between the portable computer and the main computer.

* * * * *